United States Patent
Mozer et al.

(10) Patent No.: US 10,880,833 B2
(45) Date of Patent: Dec. 29, 2020

(54) SMART LISTENING MODES SUPPORTING QUASI ALWAYS-ON LISTENING

(71) Applicant: Sensory, Incorporated, Santa Clara, CA (US)

(72) Inventors: Todd F. Mozer, Los Altos Hills, CA (US); Bryan Pellom, Erie, CO (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 15/463,805

(22) Filed: Mar. 20, 2017

(65) Prior Publication Data

US 2017/0311261 A1    Oct. 26, 2017

Related U.S. Application Data (60) Provisional application No. 62/327,112, filed on Apr. 25, 2016.

(51) Int. Cl.
*H04W 52/02* (2009.01)
*H04W 8/24* (2009.01)
*G06N 20/00* (2019.01)

(52) U.S. Cl.
CPC ......... *H04W 52/0229* (2013.01); *H04W 8/24* (2013.01); *G06N 20/00* (2019.01); *Y02D 30/70* (2020.08)

(58) Field of Classification Search
None
See application file for complete search history.

(56) References Cited

U.S. PATENT DOCUMENTS

2008/0117038 A1    5/2008   Stark et al.
2010/0312547 A1*  12/2010   Van Os ................ G06F 3/167
                                                                704/9

(Continued)

FOREIGN PATENT DOCUMENTS

CN     102609091 A     7/2012
CN     102918493 A     2/2013

(Continued)

OTHER PUBLICATIONS

First Office Action with English Translation and Search Report issued by China National Intellectual Property Administration, Application No. 201710270086.3, dated Aug. 13, 2019, 18 pages.

(Continued)

*Primary Examiner* — Gregory B Sefcheck
*Assistant Examiner* — Suk Jin Kang
(74) *Attorney, Agent, or Firm* — Fountainhead Law Group PC (57) ABSTRACT

Smart listening modes for supporting quasi always-on listening on an electronic device are provided. In one embodiment, the electronic device can determine that a user is likely to utter a voice trigger in order to access the always-on listening functionality of the electronic device. In response to this determination, the electronic device can automatically enable the always-on listening functionality. Similarly, the electronic device can determine that a user is no longer likely to utter the voice trigger in order to access the always-on listening functionality of the electronic device. In response to this second determination, the electronic device can automatically disable the always-on listening functionality.

21 Claims, 5 Drawing Sheets

(56) References Cited

U.S. PATENT DOCUMENTS

| | | | |
|---|---|---|---|
| 2011/0238191 A1 | 9/2011 | Kristjansson et al. | |
| 2013/0054945 A1* | 2/2013 | Free | G06F 1/3203 |
| | | | 713/2 |
| 2013/0095805 A1 | 4/2013 | LeBeau et al. | |
| 2014/0122078 A1* | 5/2014 | Joshi | G06F 1/324 |
| | | | 704/251 |
| 2014/0214429 A1* | 7/2014 | Pantel | G10L 21/16 |
| | | | 704/275 |
| 2014/0222436 A1* | 8/2014 | Binder | G06F 3/167 |
| | | | 704/275 |
| 2014/0274203 A1* | 9/2014 | Ganong, III | H04W 52/0251 |
| | | | 455/556.1 |
| 2014/0274211 A1* | 9/2014 | Sejnoha | H04M 1/72519 |
| | | | 455/563 |
| 2014/0278435 A1* | 9/2014 | Ganong, III | G10L 15/22 |
| | | | 704/275 |
| 2014/0317734 A1* | 10/2014 | Valencia | G06F 21/552 |
| | | | 726/22 |
| 2015/0039311 A1 | 2/2015 | Clark et al. | |
| 2015/0112690 A1* | 4/2015 | Guha | G06F 1/3203 |
| | | | 704/275 |
| 2015/0134331 A1* | 5/2015 | Millet | G06F 3/165 |
| | | | 704/243 |
| 2015/0170053 A1* | 6/2015 | Miao | G06N 20/00 |
| | | | 706/12 |
| 2015/0185837 A1* | 7/2015 | Whitney | G06F 3/014 |
| | | | 345/156 |
| 2015/0185995 A1* | 7/2015 | Shoemaker | H04M 1/72563 |
| | | | 715/708 |
| 2015/0340042 A1* | 11/2015 | Sejnoha | H04M 1/72519 |
| | | | 704/275 |
| 2015/0350770 A1* | 12/2015 | Khenkin | H04R 3/00 |
| | | | 381/111 |
| 2015/0350772 A1* | 12/2015 | Oliaei | H04R 1/04 |
| | | | 381/111 |
| 2016/0021535 A1* | 1/2016 | Tali | H04W 68/00 |
| | | | 455/411 |
| 2016/0037345 A1* | 2/2016 | Margadoudakis | H04L 63/0853 |
| | | | 455/411 |
| 2016/0044394 A1* | 2/2016 | Derom | H04R 1/00 |
| | | | 367/95 |
| 2016/0066113 A1* | 3/2016 | Elkhatib | H04R 29/004 |
| | | | 381/56 |
| 2016/0077794 A1* | 3/2016 | Kim | G10L 15/20 |
| | | | 704/275 |
| 2016/0093313 A1* | 3/2016 | Vickers | G10L 21/0264 |
| | | | 704/232 |
| 2016/0155443 A1* | 6/2016 | Khan | G10L 15/22 |
| | | | 704/275 |
| 2016/0174025 A1* | 6/2016 | Chaudhri | H04W 4/02 |
| | | | 455/41.1 |
| 2016/0358078 A1* | 12/2016 | Lacerda | G06F 16/285 |
| 2016/0358605 A1* | 12/2016 | Ganong, III | H04W 52/0251 |
| 2016/0379105 A1* | 12/2016 | Moore, Jr. | G06F 3/167 |
| | | | 706/11 |
| 2017/0031420 A1* | 2/2017 | Wong | H04W 52/0254 |
| 2017/0041874 A1* | 2/2017 | Jarosinski | G06F 1/3215 |
| 2017/0053152 A1* | 2/2017 | Medina | G06F 1/3231 |
| 2017/0094710 A1* | 3/2017 | Nirantar | H04W 76/045 |
| 2017/0124362 A1* | 5/2017 | Chaudhri | H04B 1/385 |
| 2017/0150305 A1* | 5/2017 | Sheng | H04W 4/021 |
| 2017/0154626 A1* | 6/2017 | Kim | G10L 15/22 |
| 2017/0162192 A1* | 6/2017 | Clark | G10L 15/1807 |
| 2017/0162205 A1* | 6/2017 | Melvin | G10L 17/06 |
| 2017/0243581 A1* | 8/2017 | Mozer | G10L 15/25 |
| 2017/0263243 A1* | 9/2017 | Clark | G10L 15/1807 |
| 2017/0263244 A1* | 9/2017 | Clark | G10L 15/1807 |
| 2017/0270913 A1* | 9/2017 | Clark | G10L 15/1807 |
| 2017/0270914 A1* | 9/2017 | Clark | G10L 15/1807 |
| 2018/0007558 A1* | 1/2018 | Maragoudakis | H04M 1/67 |
| 2018/0049028 A1* | 2/2018 | Tali | H04W 4/029 |
| 2018/0240472 A1* | 8/2018 | Vickers | G10L 21/0224 |
| 2018/0329679 A1* | 11/2018 | Lenchner | G10L 15/1822 |
| 2019/0014476 A1* | 1/2019 | Maragoudakis | H04M 1/67 |
| 2019/0189125 A1* | 6/2019 | Van Os | G06F 3/167 |

FOREIGN PATENT DOCUMENTS

| | | |
|---|---|---|
| CN | 103282957 A | 9/2013 |
| CN | 103570474 A | 2/2014 |
| CN | 103581419 A | 2/2014 |
| CN | 103905638 A | 7/2014 |
| CN | 104144252 A | 11/2014 |
| WO | 2015078155 A | 6/2015 |

OTHER PUBLICATIONS

Second Office Action with English Translation and Search Report issued by China National Intellectual Property Administration, Application No. 201710270086.3, dated Apr. 3, 2020, 17 pages.

* cited by examiner

SMART LISTENING MODES SUPPORTING QUASI ALWAYS-ON LISTENING

CROSS-REFERENCES TO RELATED APPLICATIONS

The present application claims the benefit and priority of U.S. Provisional Patent Application No. 62/327,112, filed Apr. 25, 2016, entitled "SMART LISTENING MODES SUPPORTING QUASI ALWAYS-ON VOICE PROCESSING." The entire contents of this application are incorporated herein by reference in its entirety for all purposes.

BACKGROUND

Many electronic devices available today support "always-on listening," which involves continuously listening for a particular wake-up word or phrase (also known as a voice trigger) and then processing subsequent speech as part of a natural language interface. While this feature is useful for enabling hands-free command and control of such devices, the process of listening for and recognizing a voice trigger is a computationally complex task that requires a significant amount of power. As a result, always-on listening cannot be used for long periods of time on small form-factor battery-powered devices (such as mobile and wearable devices) in which battery capacity is relatively limited.

Some mobile device manufacturers have attempted to work around this issue by only allowing always-on listening when, e.g., their devices are connected to AC power (in the case of Apple), or when a specific application dedicated to this function is placed in the mobile operating system (OS) foreground (in the case of Google). The problem with these restrictions is that they prevent the use of always-on listening in many common scenarios where a user may want or need to take advantage of this functionality. For example, a user may be exercising at the gym with his/her device operating on battery power and may want to use always-on listening to request the playback of a particular song. Alternatively, a user may be actively using a GPS application while driving his/her car (such that the GPS app is in the OS foreground) and may want to use always-on listening to request the operating hours of the store he/she is driving to. For these and many other similar scenarios, improved techniques are needed to manage the power consumption of always-on listening in a more intelligent and flexible manner.

SUMMARY

Smart listening modes for supporting quasi always-on listening on an electronic device are provided. In one embodiment, the electronic device can determine that a user is likely to utter a voice trigger in order to access the always-on listening functionality of the electronic device. In response to this determination, the electronic device can automatically enable the always-on listening functionality. Similarly, the electronic device can determine that a user is no longer likely to utter the voice trigger in order to access the always-on listening functionality of the electronic device. In response to this second determination, the electronic device can automatically disable the always-on listening functionality.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure are directed to smart listening modes that allow an electronic device to support "quasi always-on listening" (i.e., always-on listening functionality that is dynamically and autonomously enabled and disabled by the device). More specifically, with these smart listening modes, the electronic device can automatically enable (i.e., turn on) the device's always-on listening functionality in scenarios where the device determines that there is a relatively high likelihood that a user is speaking (or will soon speak) to the device, and can automatically disable (i.e., turn off) the device's always-on listening functionality in scenarios where the device determines that there is a relatively low likelihood that a user is speaking (or will soon speak) to the device. In this way, the electronic device can intelligently control its always-on listening behavior to reduce the amount of power consumed by this feature, while also ensuring that the feature will available to users at times when they will most likely want or need to use it.

According to one set of embodiments, the electronic device can implement a first smart listening mode that relies on a machine learning-based analysis of the device user's current and past interactions with the device and/or its always-on listening functionality in order to determine, on a continuous basis, whether that functionality should be enabled or disabled at any given point in time. This analysis can take into account a number of different factors including (but not limited to) (1) the current time of day and the past times of day when the user has typically used the device or its always-on listening functionality; (2) the current geographic location of the device and past geographic locations where the user has typically used the device or its always-on listening functionality; (3) the current environment conditions sensed by the device and the past environmental conditions under which the user has typically used the device or its always-on listening functionality; (4) the current physical state of the device (e.g., orientation, acceleration, etc.) and past physical states under which the user has typically used the device or its always-on listening functionality; and (5) the current software state of the device and past software states under which the user has typically used the device or its always-on listening functionality.

According to another set of embodiments, the electronic device can implement a second smart listening mode that makes use of one or more pre-programmed or user-defined "trigger events." When the electronic device determines that a particular trigger event has occurred, the device can automatically turn on its always-on listening functionality for a certain period of time (e.g., X seconds or minutes), and then automatically turn off the functionality once the time interval has expired. Examples of such trigger events can include, e.g., the launching or closing of a specific app, the termination of a phone call, a change in the physical state of the device, the initiation of playing a media file (e.g., a song, video, etc.), and so on.

According to yet another set of embodiments, the electronic device can implement a third smart listening mode that involves determining when the user is physically near the device (i.e., is "present") and upon making such a determination, automatically turning on the device's always-on listening functionality. If the user subsequently moves away from the device beyond some distance threshold (i.e., is considered to be no longer present), the electronic device can automatically turn off the always-on listening functionality and keep it off until the device determines that the user is present again. There are various ways in which this presence-based determination can be performed, such as via detecting the presence of a second factor device owned/used/worn by the user or via the use of various sensors that can determine the relative locations of the user and the device.

The foregoing and other aspects of the present disclosure are described in further detail below.

1. System Environment

Figure 1:
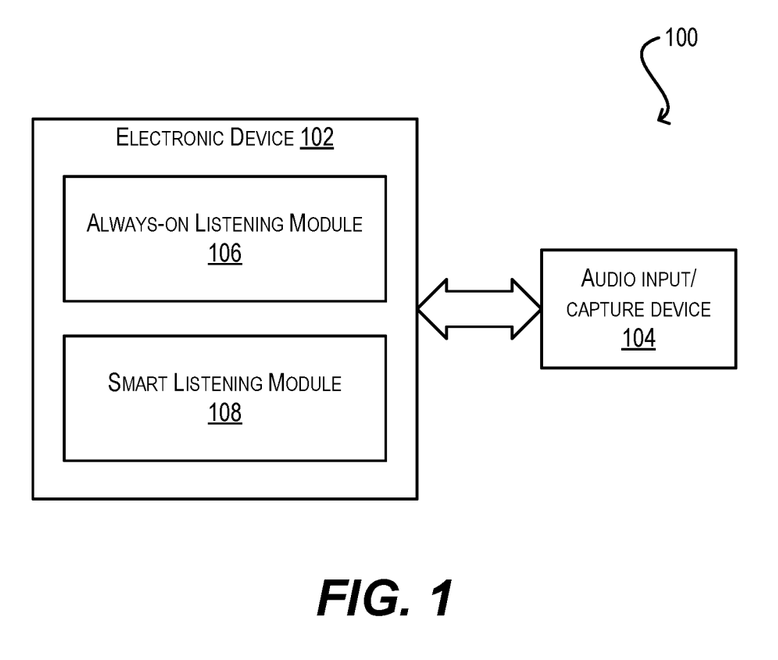
FIG. 1 depicts a block diagram of a system environment according to one embodiment.

FIG. 1 depicts an example system environment 100 in which embodiments of the present disclosure may be implemented. As shown, system environment 100 includes an electronic device 102 that is communicatively coupled to an audio input/capture device 104. In one set of embodiments, electronic device 102 can be a small form-factor battery-based device, such as a smartphone, a tablet, a smartwatch, or the like. In other embodiments, electronic device 102 can be a larger AC power-based device or system, such as a smart speaker, a home automation or security system, a media streaming device, a smart television, a video game console, a public kiosk, an in-vehicle computer system, or the like.

Audio input/capture device 104 can be, e.g., a microphone, voice recorder, headset, or the like. In certain embodiments, audio input/capture device 104 can be incorporated into (i.e., integrally included in) electronic device 102. In other embodiments, audio input/capture device 104 can be separate from electronic device 102 and can communicate with device 102 via an external connection mechanism (e.g., a point-to-point cable or wireless protocol, a local or wide area network, etc.).

In addition to electronic device 102 and audio input/capture device 104, system environment 100 further includes an always-on listening module 106, which may run on electronic device 102 (as shown in FIG. 1) or on another device/system such as a cloud-based server (not shown). In operation, always-on listening module 106 can continually listen for the utterance of a predefined voice trigger by receiving a continuous stream of audio captured via audio input/capture device 104 and processing the continuous audio stream (using, e.g., a phrase spotting algorithm) in order to determine whether the voice trigger has been spoken. If always-on listening module 106 determines that the voice trigger has been spoken, module 106 can recognize and process one or more voice queries or commands that are included in the audio stream immediately following the voice trigger.

As noted in the Background section, one challenge with supporting always-on listening is that the processing needed to continually listen for the voice trigger is computationally expensive and thus requires a significant amount of power. This makes it difficult or impossible to use always-on listening for long periods of time on small form-factor battery-powered devices. Further, even in the case of larger AC-powered devices, it would be preferable to reduce the power requirements of always-on listening for efficiency purposes.

To address the foregoing and other similar issues, electronic device 102 of FIG. 1 is enhanced to implement a novel "smart listening" module 108. At a high level, smart listening module 108 can regulate the operation of always-on listening module 106 (i.e., dynamically turn the functionality of module 106 on and off) based on its understanding of whether a user of electronic device 102 is likely to be speaking (or will soon speak) to device 102 for the purpose of submitting a voice command/query to always-on listening module 106. Stated another way, smart listening module 108 can automatically turn on always-on listening in cases where it determines that there is a high likelihood that a user is speaking (or will soon speak) to device 102, and can automatically turn off always-on listening in cases where it determines that there is a low likelihood that a user is speaking (or will soon speak) to device 102. In this manner, smart listening module 108 can ensure that the functionality of always-on listening module 106 is available to users when they want/need to use it, while at the same time reduce the total amount of device power consumed by this feature.

In one set of embodiments, smart listening module 108 can perform the functions described above by operating in a "machine learning-based smart listening mode" that determines user speaking probabilities using a machine learning model. In another set of embodiments, smart listening module 108 can perform the functions described above by operating in an "event-based smart listening mode" that determines user speaking probabilities based upon the occurrence of one or more trigger events. In yet another set of embodiments, smart listening module 108 can perform the functions described above by operating in a "presence-based smart listening mode" that determines user speaking probabilities based upon the geographic closeness of a user to the electronic device 102. The details of each of these modes, which may be implemented separately or in combination, are described in the sections that follow.

It should be appreciated that system environment 100 of FIG. 1 is illustrative and not intended to limit embodiments of the present disclosure. For example, the various entities shown in FIG. 1 may be arranged according to different configurations or may include subcomponents or functions that are not explicitly described. One of ordinary skill in the art will recognize other variations, modifications, and alternatives.

2. Machine Learning-Based Smart Listening Mode

When smart listening module 108 operates in machine learning-based smart listening mode, module 108 can create and refine a machine learning-based model that outputs a probability of whether a user is speaking (or will soon speak) to the device (i.e., a "user speaking probability") under various device state and usage scenarios that are captured from a user's past (i.e. historical) usage patterns and behavior. Smart listening module 108 can then apply the machine learning-based model to the user's current device interactions in order to determine, on an ongoing basis, whether the functionality of always-on listening module 106 should be automatically turned off or turned on.

Figure 2:
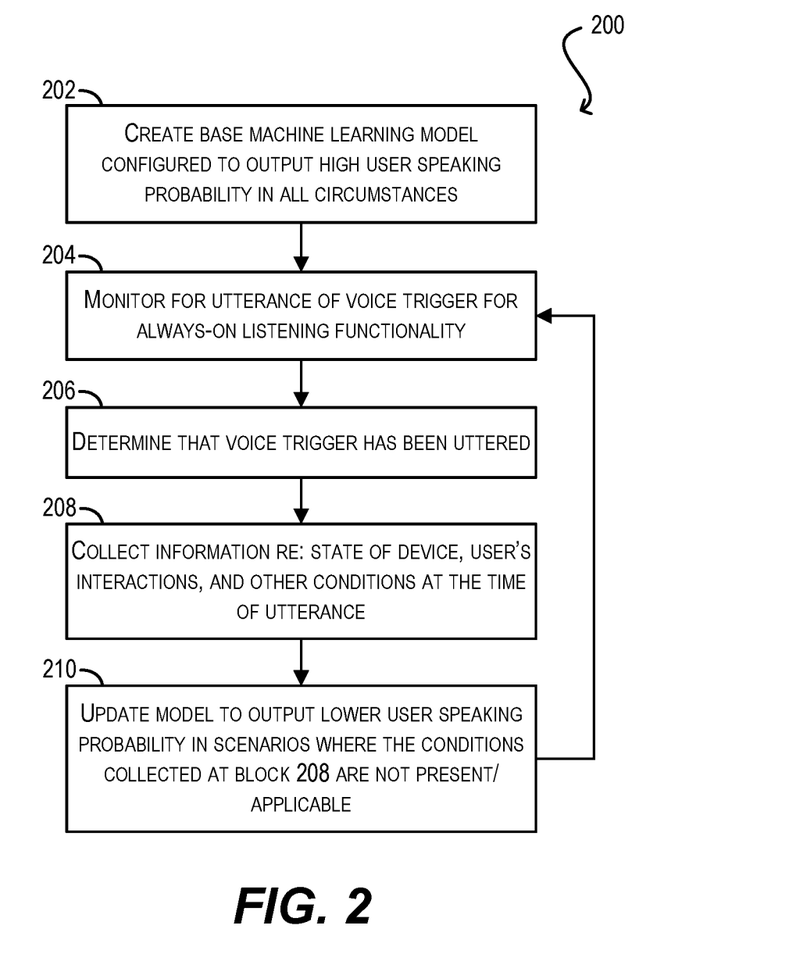
FIGS. 2 and 3 depict workflows for implementing a machine learning-based smart listening mode according to one embodiment.
Figure 3:
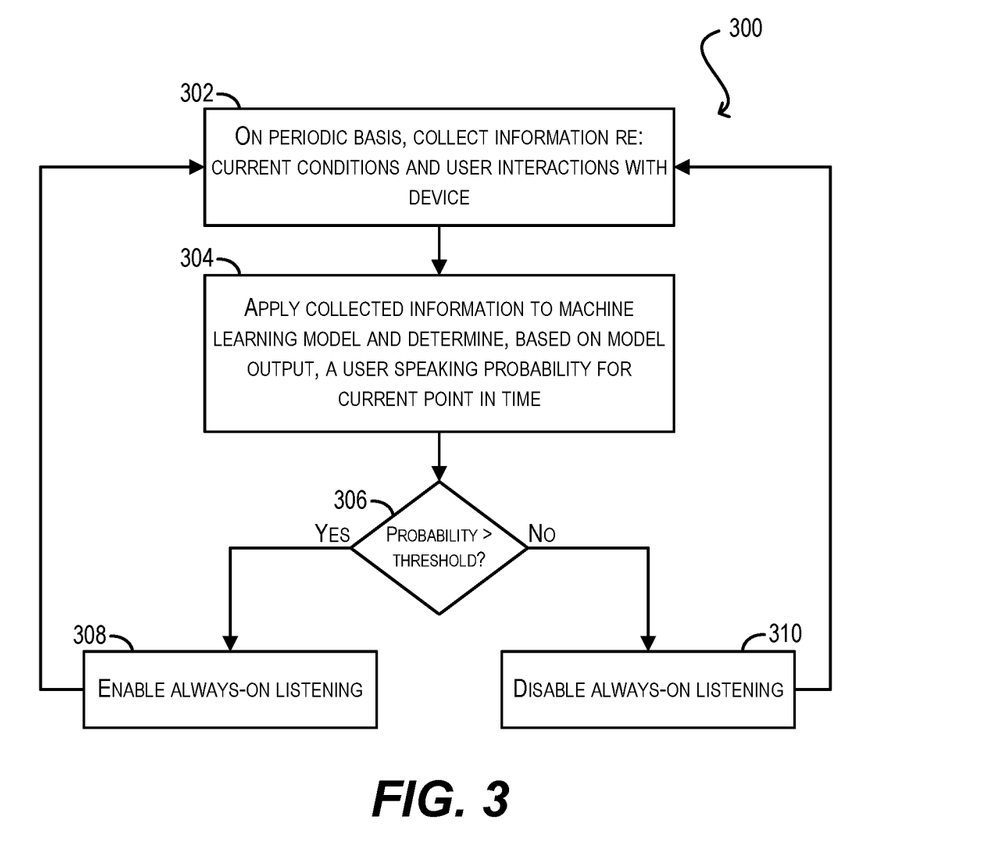

FIGS. 2 and 3 depict workflows 200 and 300 for implementing the model creation and model application steps respectively according to an embodiment. Starting with block 202 of workflow 200, smart listening module 108 can first create a "base" model that is configured to output a high user speaking probability under all circumstances. This base model serves as a conservative base level of intelligence for enabling or disabling always-on listening, since it is possible that a user may make use of always-on listening very often. The specific manner in which module 108 performs this creation step, as well as the implementation details of the model, will differ depending on the machine learning technique used. For instance, in one embodiment, the model may be a deep neural network (DNN). In another embodiment, the model may be a machine learning decision tree. In yet another embodiment, the model may be a recurrent neural network with long short-term memory (LSTM). One of ordinary skill in the art will recognize many different types of machine learning techniques that may be used for this purpose.

At block 204, smart listening module 108 can communicate with always-on listening module 106 to monitor for the utterance of a voice trigger understood by module 106. Upon determining that the always-on listening trigger has been uttered (indicating that the user wishes to submit a voice command/query) (block 206), smart listening module 108 can collect (via the electronic device 102's software and/or hardware sensors) various types of information regarding the state of device 102, the user's interaction with device 102, and/or other conditions present at the time of the voice trigger utterance (block 208). In this way, smart listening module 108 can understand the specific circumstances under which the user invoked the always-on listening functionality of device 102. The types of information collected at block 208 can include, but is not limited to, the time of day, the geographic location of device 102, the environmental conditions in the vicinity of device 102 (e.g., light level, amount of ambient noise, etc.), device 102's physical state (e.g., orientation, acceleration, speed of movement, etc.), and the device 102's software state (e.g., what applications are open or in the foreground, etc.).

Once the foregoing information has been collected, smart listening module 108 can update/refine the model created at block 202 in a manner that causes the model to output a lower user speaking probability in scenarios where the conditions captured in the collected information are not applicable/present (block 210). For instance, if the information collected at block 208 indicates that the user uttered the voice trigger at 10 AM in San Francisco, smart listening module 108 can update the model to output a lower user speaking probability for scenarios where the device is not in San Francisco and/or where the current time is not in the morning. Finally, at the conclusion of block 210, smart listening module 108 can return to block 204 in order to monitor for further utterances for the voice trigger and to update the model appropriately.

With workflow 200, smart listening module 108 can effectively create, refine and adapt its machine learning-based model in order to learn the circumstances under which the user is most likely to speak to device 102 for the purpose of using its always-on listening functionality. Smart listening module 108 can continue executing workflow 200 over some period of time (e.g., a training period of X days) until a sufficient amount of information has been collected to learn the behavior patterns of the user.

Turning now to workflow 300 of FIG. 3, once the machine learning-based model has been created and refined, smart listening module 108 can, on a periodic basis, collect information regarding the current conditions and behavior surrounding the user's ongoing interactions with the device (block 302). The specific information collected at block 302 can be consistent with the types of information captured during the model creation/updating workflow of FIG. 2, such as time of day, geographic device location, environmental conditions, physical device state, and software device state.

At block 304, smart listening module 108 can apply the collected information to its machine learning-based model and thereby determine, based on the model's output, a user speaking probability for the current point in time. Smart listening module 108 can then compare the user speaking probability against a predefined probability threshold (block 306).

If the user speaking probability exceeds the threshold, smart listening module 108 can automatically enable the always-on listening functionality of device 102 (if it is not already enabled) (block 308). Conversely, if the user speaking probability equals or falls below the threshold, smart listening module 108 can automatically disable the always-on listening functionality of device 108 (if it is not already disabled) (block 310). In this way, module 108 can dynamically turn this functionality on or off based on the model's understanding of whether the user likely wants/needs to presently use it.

Finally, at the conclusion of either block 308 or block 310, smart listening module 108 can return to block 302 and repeat the workflow for the next periodic interval.

3. Event-Based Smart Listening Mode

When smart listening module 108 operates in event-based smart listening mode, module 108 can rely on a set of "trigger events" that are pre-programmed into electronic device 102 (by, e.g., the device manufacturer or OS provider) and/or are defined by a device user. These trigger events may include, but are not limited to, the start of playback of a song, the end of playback of a song, the activation of a device button, the conclusion of a phone call, a change in the physical state of the device (e.g., orientation/speed/acceleration, etc.), and so on. Generally speaking, the trigger events can indicate a high probability that a user will want to make use of the always-on listening functionality of electronic device 102 in the immediate future. Thus, upon detecting the occurrence of such an event, smart listening module 108 can automatically turn on always-on listening for a certain period of time (e.g., X seconds or Y minutes), and then automatically turn it off once that period has elapsed.

Figure 4:
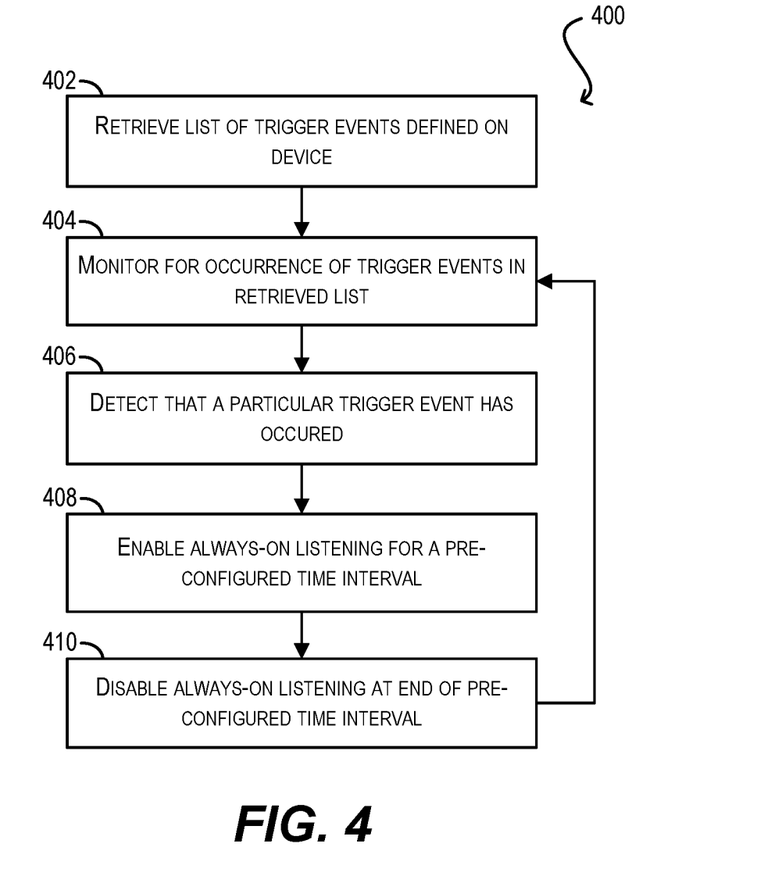
FIG. 4 depicts a workflow for implementing an event-based smart listening mode according to one embodiment.

FIG. 4 depicts a workflow 400 for implementing this event-based smart listening mode according to an embodiment. Starting with block 402, smart listening module 108 can retrieve a list of trigger events that are defined on electronic device 102. As mentioned previously, the trigger events can be pre-programmed into device 102 or may be defined by a device user. In some cases, one or more trigger events may be pre-programmed but subsequently customized/adjusted by a device user. Examples of these trigger events include, e.g., events that relate to the playback of media, events that relate to the interaction with the hardware of electronic device 102 (e.g., button activation, touch gesture, etc.), events that relate to time or location, events that relate to environmental conditions, and so on.

At block 404, smart listening module 108 can monitor for the occurrence of the trigger events retrieved at block 402. The specific way in which module 108 performs this monitoring can depend on the nature of each trigger event. For example, if the trigger event is a hardware button activation, smart listening module 108 can poll the operating system of electronic device 102 to determine the occurrence of this button activation. Alternatively, if the trigger event is the playback of a media file, smart listening module 108 can communicate with the media player component of electronic device 102 to determine the initiation of this playback.

At blocks 406 and 408, smart listening module 108 can detect that a particular trigger event has occurred and, in response, can automatically enable always-on listening for a pre-configured time interval (e.g., X seconds, Y minutes, etc.). In one embodiment, the pre-configured time interval can be the same across all trigger events. In other embodiments, the pre-configured time interval can be defined on a per-event basis. Note that as the duration of this interval is increased, the amount of power consumed by electronic device 102 will also increase, but the user will also be given a longer window for submitting voice commands/queries.

Finally, at block 410, smart listening module 108 can automatically turn off always-on listening at the end of the time interval and can return to block 404 in order to monitor for further trigger events.

4. Presence-Based Smart Listening Mode

When smart listening module 108 operates in presence-based smart listening mode, module 108 can determine the likelihood of whether a user is speaking (or will soon speak) to electronic device 102 based on the relative distance between the user and the device. Thus, for example, if the user comes within some threshold distance of electronic device 102, smart listening module 108 can conclude that there is a high user speaking probability and automatically turn on always-on listening. On the other hand, if the user subsequently moves beyond the threshold distance, smart listening module 108 can conclude that there is a low user speaking probability and automatically turn off always-on listening.

There are a number of different ways in which smart listening module 108 can detect the presence, or non-presence, of the user. For example, in one embodiment, smart listening module 108 can monitor for the presence of a second factor device that is known to be owned/worn/associated with the user, such as a Bluetooth-based security dongle, smart watch, phone, or the like. Upon detecting the presence of this second factor device, smart listening module 108 can conclude that the user is present and enable always-on listening (if it is not already enabled). Further, upon determining that the second factor device can no longer be detected, smart listening module 108 can conclude that the user has left the vicinity and can disable always-on listening (if it is not already disabled).

In another embodiment, one or more third-party sensors may be used for this presence-based analysis. For example, smart listening module 108 may be configured to communicate with motion detectors in a home, intelligent powered security cameras, and/or other presence-sensing devices. Based on this communication, smart listening module 108 can identify the presence of the user in, e.g., a particular room in a home or some other location that is being monitored via the sensors. Module 108 can then use this information to aid in its presence-based analysis of whether to enable or disable always-on listening. In some embodiments, presence-based analysis may also be used as an input/factor in the machine learning-based model described in Section (2) above.

5. Example Computing System/Device

Figure 5:
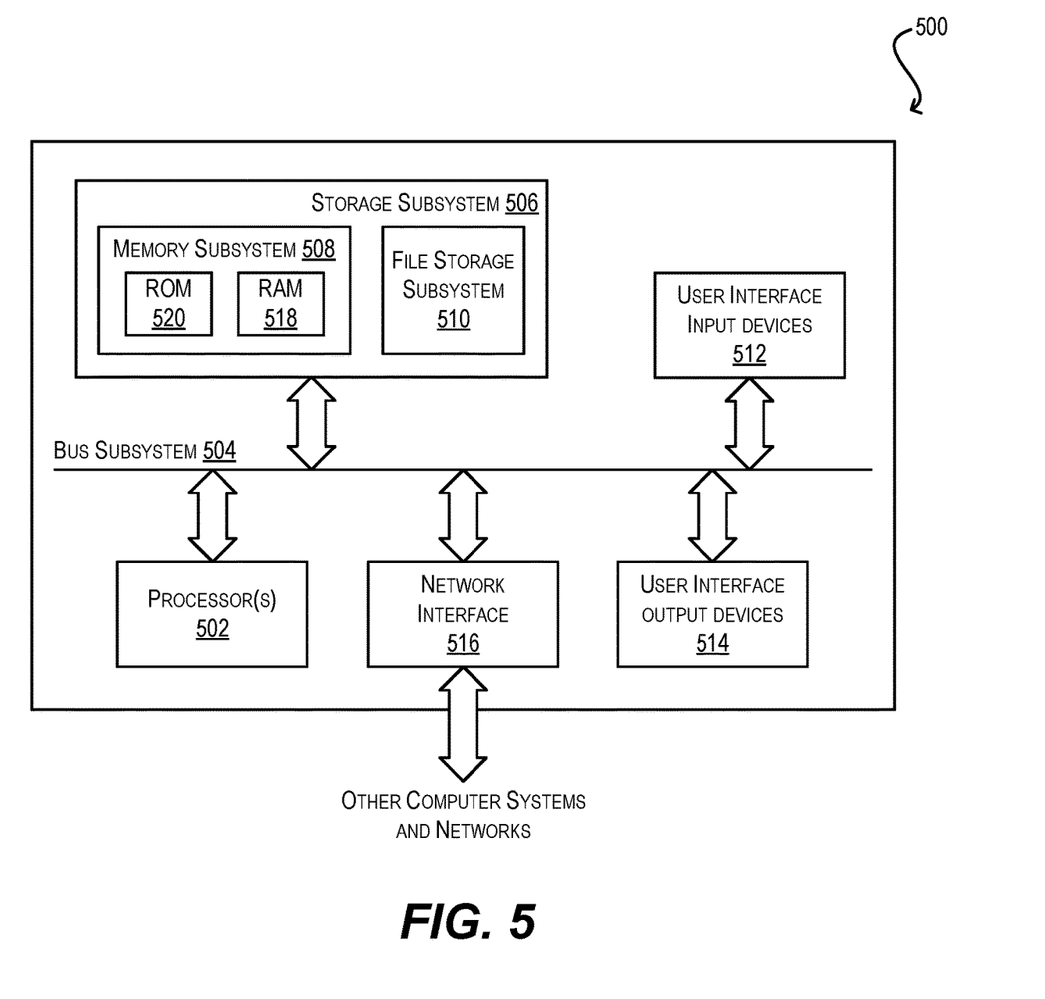
FIG. 5 depicts a block diagram of a computing device/system according to one embodiment.

FIG. 5 depicts an example computing system/device 500 in which certain embodiments of the present disclosure may be implemented. Computing system/device 500 may be used to implement electronic device 102 depicted in FIG. 1 and described throughout this disclosure.

As shown, computing system/device 500 can include one or more processors 502 that communicate with a number of peripheral devices via a bus subsystem 504. These peripheral devices can include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computing system/device 500 communicate with each other as intended. Although bus subsystem 504 is shown schematically as a single bus, alternative embodiments of the bus subsystem can utilize multiple buses.

Network interface subsystem 516 can serve as an interface for communicating data between computing system/device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

User interface input devices 512 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computing system/device 500.

User interface output devices 514 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computing system/device 500.

Storage subsystem 506 can include a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing system/device 500 is illustrative and many other configurations having more or fewer components than computing system/device 500 are possible.

The above description illustrates various embodiments along with examples of how aspects of the embodiments may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   determining, by an electronic device, that a user is likely to utter a voice trigger in order to access always-on listening functionality of the electronic device; and
   in response to determining that the user is likely to utter the voice trigger, enabling, by the electronic device, the always-on listening functionality,
   wherein the determining comprises applying a machine learning model that is trained based on the user's past interactions with the electronic device, the applying including:
      collecting information regarding a current set of conditions and a current set of user interactions with the electronic device;
      providing the collected information as input to the machine learning model;
      determining a likelihood that the user will utter the voice trigger based on output generated by the machine learning model in response to the input;
      comparing the likelihood to a predefined probability threshold; and
      determining that the likelihood exceeds the predefined probability threshold, and
   wherein the machine learning model is trained by:
      creating the machine learning model in an initial state configured to output a first probability indicating that the user is likely to utter the voice trigger;
      monitoring for utterances of the voice trigger by the user;
      upon detecting an utterance of the voice trigger by the user, collecting information regarding one or more conditions present at a time of the utterance, the one or more conditions including an environmental condition in a vicinity of the electronic device, a physical state of the electronic device, and a software state of the electronic device; and
      updating the machine learning model to output a second probability lower than the first probability that the user is likely to utter the voice trigger under circumstances in which the one or more conditions are not present.

2. The method of claim 1 further comprising, subsequently to the enabling:
   determining that the user is no longer likely to utter the voice trigger in order to access the always-on listening functionality of the electronic device; and
   in response to determining that the user is no longer likely to utter the voice trigger, disabling the always-on listening functionality.

3. The method of claim 1 wherein the one or more conditions further include a time of day and a geographic location of the electronic device at the time of the utterance.

4. The method of claim 1 wherein the determining further comprises:
   detecting an occurrence of a pre-defined trigger event.

5. The method of claim 4 wherein if the pre-defined trigger event is detected, the always-on listening functionality is enabled for a pre-configured period of time.

6. The method of claim 2 wherein determining that the user is no longer likely to utter the voice trigger in order to access the always-on listening functionality of the electronic device comprises:
   determining, via the computer communication protocol, that a second factor device owned by the user is no longer within the threshold distance to the electronic device.

7. The method of claim 6 wherein the second factor device owned by the user is a smart watch or a smartphone.

8. A non-transitory computer readable storage medium having stored thereon program code executable by an electronic device, the program code causing the electronic device to:
   determine that a user is likely to utter a voice trigger in order to access always-on listening functionality of the electronic device; and
   in response to determining that the user is likely to utter the voice trigger, enable the always-on listening functionality,
   wherein the determining comprises applying a machine learning model that is trained based on the user's past interactions with the electronic device, the applying including:
      collecting information regarding a current set of conditions and a current set of user interactions with the electronic device;
      providing the collected information as input to the machine learning model;
      determining a likelihood that the user will utter the voice trigger based on output generated by the machine learning model in response to the input;
      comparing the likelihood to a predefined probability threshold; and
      determining that the likelihood exceeds the predefined probability threshold, and
   wherein the machine learning model is trained by:
      creating the machine learning model in an initial state configured to output a first probability indicating that the user is likely to utter the voice trigger;
      monitoring for utterances of the voice trigger by the user;

upon detecting an utterance of the voice trigger by the user, collecting information regarding one or more conditions present at a time of the utterance, the one or more conditions including an environmental condition in a vicinity of the electronic device, a physical state of the electronic device, and a software state of the electronic device; and updating the machine learning model to output a second probability lower than the first probability that the user is likely to utter the voice trigger under circumstances in which the one or more conditions are not present.

9. The non-transitory computer readable storage medium of claim 8 wherein the program code further causes the electronic device to, subsequently to the enabling:

determine that the user is no longer likely to utter the voice trigger in order to access the always-on listening functionality of the electronic device; and in response to determining that the user is no longer likely to utter the voice trigger, disable the always-on listening functionality.

10. The non-transitory computer readable storage medium of claim 8 wherein the one or more conditions further include a time of day and a geographic location of the electronic device at the time of the utterance.

11. The non-transitory computer readable storage medium of claim 8 wherein the determining further comprises:

detecting an occurrence of a pre-defined trigger event.

12. The non-transitory computer readable storage medium of claim 11 wherein if the pre-defined trigger event is detected, the always-on listening functionality is enabled for a pre-configured period of time.

13. The non-transitory computer readable storage medium of claim 9 wherein determining that the user is no longer likely to utter the voice trigger in order to access the always-on listening functionality of the electronic device comprises:

determining, via the computer communication protocol, that a second factor device owned by the user is no longer within the threshold distance to the electronic device.

14. The non-transitory computer readable storage medium of claim 13 wherein the second factor device owned by the user is a smart watch or a smartphone.

15. An electronic device comprising:

a processor; and a non-transitory computer readable medium having stored thereon program code that, when executed by the processor, causes the processor to:

determine that a user is likely to utter a voice trigger in order to access always-on listening functionality of the electronic device; and in response to determining that the user is likely to utter the voice trigger, enable the always-on listening functionality, wherein the determining comprises applying a machine learning model that is trained based on the user's past interactions with the electronic device, the applying including:

collecting information regarding a current set of conditions and a current set of user interactions with the electronic device;

providing the collected information as input to the machine learning model;

determining a likelihood that the user will utter the voice trigger based on output generated by the machine learning model in response to the input;

comparing the likelihood to a predefined probability threshold; and determining that the likelihood exceeds the predefined probability threshold, and wherein the machine learning model is trained by:

creating the machine learning model in an initial state configured to output a first probability indicating that the user is likely to utter the voice trigger;

monitoring for utterances of the voice trigger by the user;

upon detecting an utterance of the voice trigger by the user, collecting information regarding one or more conditions present at a time of the utterance, the one or more conditions including an environmental condition in a vicinity of the electronic device, a physical state of the electronic device, and a software state of the electronic device; and updating the machine learning model to output a second probability lower than the first probability that the user is likely to utter the voice trigger under circumstances in which the one or more conditions are not present.

16. The electronic device of claim 15 wherein the program code further causes the processor to, subsequently to the enabling:

determine that the user is no longer likely to utter the voice trigger in order to access the always-on listening functionality of the electronic device; and in response to determining that the user is no longer likely to utter the voice trigger, disable the always-on listening functionality.

17. The electronic device of claim 15 wherein the one or more conditions further include a time of day and a geographic location of the electronic device at the time of the utterance.

18. The electronic device of claim 15 wherein the determining further comprises:

detecting an occurrence of a pre-defined trigger event.

19. The electronic device of claim 18 wherein if the pre-defined trigger event is detected, the always-on listening functionality is enabled for a pre-configured period of time.

20. The electronic device of claim 16 wherein determining that the user is no longer likely to utter the voice trigger in order to access the always-on listening functionality of the electronic device comprises:

determining, via the computer communication protocol, that a second factor device owned by the user is no longer within the threshold distance to the electronic device.

21. The electronic device of claim 20 wherein the second factor device owned by the user is a smart watch or smartphone.

* * * * *